United States Patent [19]

Pelchat

[11] 4,233,576

[45] Nov. 11, 1980

[54] AUTOMATIC POLARIZATION DECOUPLING NETWORK

[75] Inventor: Guy M. Pelchat, Indialantic, Fla.

[73] Assignee: Harris Corporation, Cleveland, Ohio

[21] Appl. No.: 906,687

[22] Filed: May 16, 1978

[51] Int. Cl.² .................. H01P 1/16; H04B 1/10
[52] U.S. Cl. .................................. 333/16; 333/18;
333/21 A; 370/2; 370/6; 370/19
[58] Field of Search ............ 325/60, 472; 179/15 BC;
333/16–18, 21 A

[56] References Cited

U.S. PATENT DOCUMENTS

| | | | |
|---|---|---|---|
| 3,500,207 | 3/1970 | Ruthroff | 325/60 X |
| 3,731,236 | 5/1973 | Di Tullio et al. | 333/21 A X |
| 3,735,266 | 5/1973 | Amitay | 179/15 BC X |
| 4,090,137 | 5/1978 | Soma et al. | 325/60 |

Primary Examiner—Paul L. Gensler
Attorney, Agent, or Firm—Craig & Antonelli

[57] ABSTRACT

An automatic polarization decoupling circuit for decoupling first and second signals originally transmitted with orthogonal polarizations comprising a rotatable quarter-wave plate and a rotatable half-wave plate for linearizing the first signal and rotating its polarization direction to a reference polarization direction, an Orthomode (trademark) transducer for separating energy in the reference polarization direction from energy with a polarization in quadrature thereto and utilizing this quadrature energy as the decoupled second signal. The system further comprises a second Orthomode transducer for recombining the in-phase and quadrature energy separated by the first Orthomode transducer and applying this recombined energy to a second rotatable quarter-wave plate and a second rotatable half-wave plate for linearizing the second signal and rotating its polarization direction to a direction in quadrature with the reference polarization direction. A third Orthomode transducer is provided to separate the energy in this quadrature reference polarization direction from the energy polarized in the reference direction. The reference direction energy separated by this third Orthomode transducer comprises the first signal in decoupled form. This system further includes a correlator for generating control signals from the two decoupled output signals to thereby control the alignments of the first and second quarter-wave plates and the first and second half-wave plates. In respective embodiments of the invention, the correlator employs a phase comparison process, one using pilot signals, the other without pilot signals.

11 Claims, 9 Drawing Figures

AUTOMATIC POLARIZATION DECOUPLING NETWORK

BACKGROUND OF THE INVENTION

1. Field of the Invention

This invention relates to satellite communication systems and, in particular, to apparatus in such systems for reducing cross-polarization interference.

2. Description of the Prior Art

A crowding of the frequency spectrum in electromagnetic transmission systems has lead to an extremely limited availability of channels for radio and satellite communications. One technique for increasing the communicating capacity of a system is to utilize two orthogonal polarizations for a given frequency. In principle, if the polarization discrimination in a system is sufficiently precise, the same frequency-band can be shared by the various cross-polarization modes of transmission and the capacity of the system can be substantially increased.

However, certain problems arise when utilizing two orthogonal linearly polarized waves which must be overcome if satisfactory system operation is to be achieved. These problems center around the transmission channel and its effect on the multiple transmitted linearly polarized waves. In particular, after propagation through a transmission channel, the received polarizations are rarely "pure" (i.e., separated). This cross-polarization cross talk is caused by various sources such as rain, nonperfect antennas (especially when viewed off axis), ionospheric propagation, and the Faraday effect. The above-listed causes will essentially convert the linearly polarized waves into elliptically polarized waves having arbitrary orientations. Moreover, it should be noted that the effects of these causes of cross-polarization vary in time. Since the individual linearly polarized waves, after conversion to elliptically polarized waves, no longer have their original polarizations, they cannot be properly detected by the receivers of the respective system in which they are propagating without also detecting the cross-coupling signals from adjacent polarization signals, i.e., cross talk. Thus, when such a multiple polarization technique is employed, it is required that such unwanted cross talk induced between the polarizations during transmission and reception of information signals be held at or below an acceptable level in order to realize the full potential of a multiple polarization system. This reduction can be accomplished by means of a cross-polarization cancellation network.

Several RF correction networks have been described including networks by T. S. Chu (U.S. Pat. No. 3,728,643); Kannowade (U.S. Pat. No. 4,027,105); D. Difonzo of COMSAT, and those of Nippon and Marconi. However, only the Kannowade patent appears to disclose a system design which enables direct analog control of the polarization cancellation network; the others require a more general search optimization algorithm. The Kannowade patent utilizes a differential attenuator, a differential phase shifter, and two axially rotatable waveguide sections to cancel cross-polarization. However, this system essentially provides linearization of both polarizations at the same time, and this simultaneous linearization requires a relatively complicated control mechanism.

OBJECTS OF THE INVENTION

An object of the present invention is to automatically eliminate cross talk in a dual-polarization communication channel.

A further object of the present invention is to automatically eliminate cross talk in two polarized channels in a consecutive manner to thereby reduce the control complexity of the system.

A still further object of the present invention is to automatically eliminate cross talk in adjacent polarized channels without the use of pilot signals.

These and further objects, features and advantages of the present invention will become more obvious from the following description when taken in connection with the accompanying drawings which show, for purposes of illustration only, several embodiments in accordance with the present invention.

SUMMARY OF THE INVENTION

In order to achieve the foregoing objects, the present invention comprises a system which operates sequentially to linearize a first signal and to rotate the polarization of this linearized first signal to a predetermined reference direction thereby decoupling a second signal polarized orthogonal to said reference direction, and then, to linearize the second signal and to rotate the polarization of this linearized second signal to a reference direction in quadrature with the first reference direction thereby decoupling the first signal polarized orthogonal to this quadrature reference direction. The foregoing sequential operation is controlled automatically in accordance with a plurality of control signals which are generated by means of a comparison of the appropriately phased decoupled signals. In one embodiment, this comparison is performed by comparing the phases of pilot signals originally transmitted with the orthogonally polarized first and second signals. In a second embodiment, this control is obtained by phase comparing the first decoupled signal with demodulated and remodulated in-phase and quadrature-phase components of the second decoupled signal while the second decoupled signal is compared to demodulated and remodulated in-phase and quadrature-phase components of the first signal.

DETAILED DESCRIPTION OF THE PREFERRED EMBODIMENT

Figure 1:
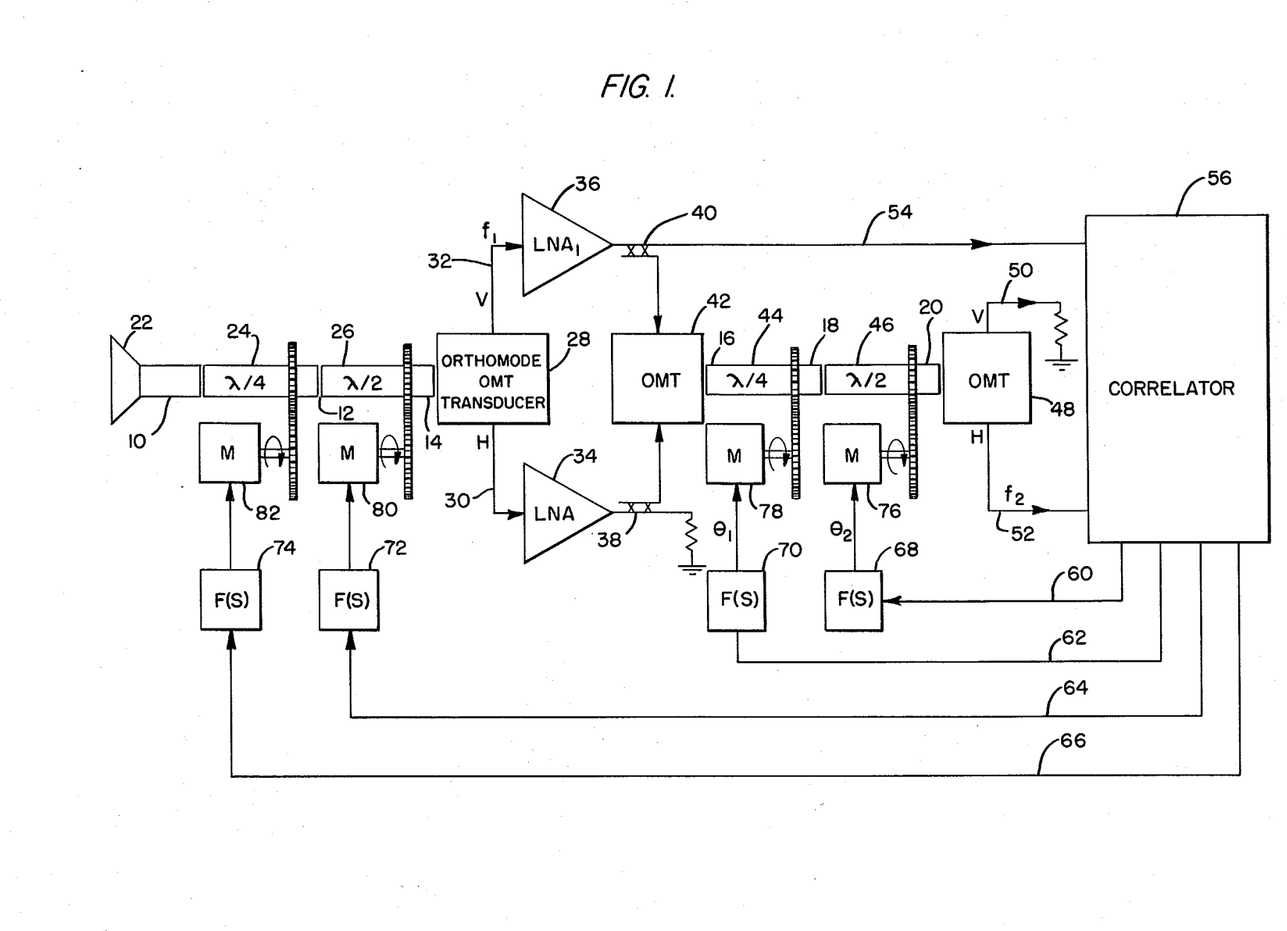
FIG. 1 is a schematic block diagram illustrating an embodiment of the present invention.
Figure 2A:
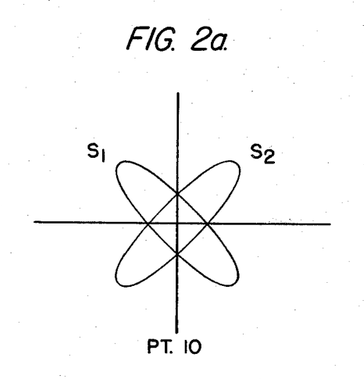
FIGS. 2a, 2b, 2c, 2d, 2e and 2f are graphical representations of the signal polarization ellipses at points 10, 12, 14, 16, 18 and 20, respectively, of FIG. 1.

Referring to FIG. 1 of the drawings, two signals $S_1$ and $S_2$, originally transmitted with linear orthogonal polarizations, are received by a dual-polarization antenna 22. Due to disturbances within the transmission medium, these originally linearly polarized waves are received by antenna 22 as elliptically polarized waves having arbitrary orientations. The elliptical signals $S_1$ and $S_2$, as they would appear at point 10 of FIG. 1, are shown in FIG. 2a. It can be seen that these two ellipses are centered on the origin of the vertical and horizontal axes of the figure and are oriented at an arbitrary angle with respect to these axes. The object of the present invention is to decouple these two signals $S_1$ and $S_2$ such that a component of signal $S_1$ polarized in a direction parallel to a reference direction can be detected in a first channel with no coupled component from signal $S_2$, while signal $S_2$, with a polarization parallel to the quadrature of the reference direction, can be detected in a second channel with no coupled component from signal $S_1$. Generally, the reference direction will be chosen as either the vertical or horizontal axis of FIG. 2a.

Figure 2B:
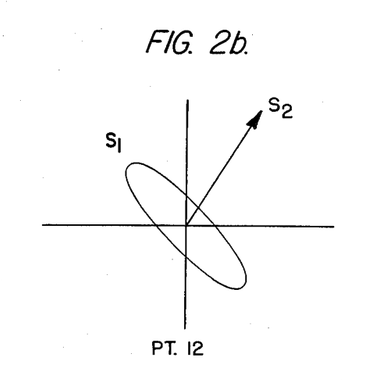

The signals on antenna 22 are applied by way of a circular waveguide 10 to a phase shifter 24. This phase shifter is designed so that the polarization component of the signal $S_2$ parallel to the minor axis of the $S_2$ ellipse is shifted 90° such that this minor axis polarization is now in-phase with the polarization along the major axis of the ellipse $S_2$. The signal $S_2$ is thus linearized as shown in FIG. 2b for the point 12 of FIG. 1.

This 90° phase shift in phase shifter 24 is preferable obtained through the use of a Simmons phase shifter. As is known, this phase shifter is a circular guide having a series of thin metal plates positioned at various points along the longitudinal axis of the circular waveguide with their planes perpendicular to this axis. By appropriately choosing the thickness of the plates, the degree of insertion of the plates into the waveguide, and the spacing and the number of plates set in the waveguide, electromagnetic energy propagating along the longitudinal axis of the waveguide is delayed. In this instance, the Simmons phase shifter is designed to obtain a delay of one-quarter wavelength. A differential phase shift of less than 90° can be used if the ranges of polarization coupling are constrained; a smaller phase shift may be desirable for wideband operation.

Figure 2C:
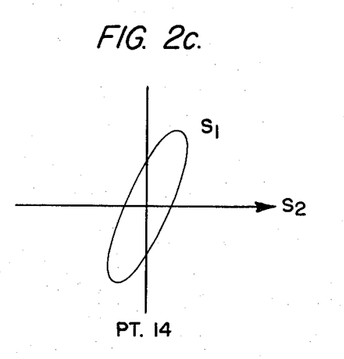

When the signal $S_2$ has been linearized at point 12 in FIG. 1, the next step is to rotate the polarization of the signal $S_2$ such that the $S_2$ polarization is parallel to the horizontal axis as shown in FIG. 2c. This polarization rotation is preferably obtained with a Simmons phase shifter 26 designed to obtain a one-half wavelength shift (180° phase shift). Phase shifter 26 rotates the linearized signal $S_2$ and the elliptical signal $S_1$ by an angle such that the signal $S_2$ is oriented parallel to the horizontal axis, as shown in FIG. 2c. This polarization rotation is preferably obtained with a Simmons phase shifter 26 designed to obtain a one-half wavelength shift (180° phase shift). Phase shifter 26 rotates the linearized signal $S_2$ and the elliptical signal $S_1$ by an angle such that the signal $S_2$ is oriented parallel to the horizontal axis, as shown in FIG. 2c.

From a review of FIG. 2c, it can be seen that there is no vertical component of $S_2$ at the point 14. Thus, by separating the vertically polarized signals from the horizontally polarized signals, the signal $S_1$ can be effectively decoupled from signal $S_2$. In order to obtain this separation of signals, the output from the half-wave plate 26 is applied to a separator device 28, such as an Orthomode transducer. The Orthomode transducer 28 functions such that one arm of the transducer responds only to a signal with vertical polarization and applies it to line 32, while a second arm responds only to a signal with horizontal polarization and applies this horizontally polarized signal to line 30. The signal on line 32 may be utilized as the decoupled $S_1$ signal.

Since the signal $S_2$ has been linearized and rotated such that it is parallel to the horizontal axis, it will have no component, i.e., zero coupling, in line 32, assuming proper adjustment of the phase shifters 24 and 26. In contradistinction, since the signal $S_1$ is still elliptical in shape, it will have a component polarized parallel to the horizontal axis. Therefore, the signal on line 30 will comprise the entire $S_2$ signal and the small horizontally polarized component $\mu$ of the signal $S_1$. The signal on line 32 will then be equal to $(1-[\mu]^2)^{\frac{1}{2}} \cdot S_1$.

Figure 2D:
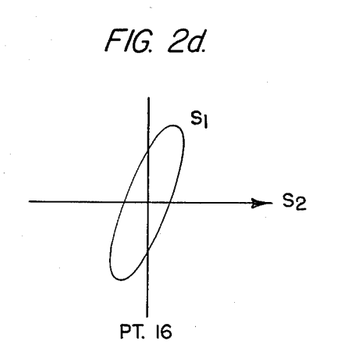

This residual coupling of the signal $S_1$ in the line 30 may be eliminated by recombining the signals separated in the Orthomode transducer 28, applying this recombined signal to a circular waveguide, and duplicating the initial cross talk elimination process utilized to decouple the signal $S_1$. More specifically, the polarized signals on lines 30 and 32 are amplified by the low-noise amplifiers 34 and 36, respectively, and then applied to the respective power splitters 38 and 40. The low-noise amplifiers are required in order to prevent excessive degradation of the system sensitivity to small signals. The power splitters 38 and 40 are coupled to an Orthomode transducer 42 which combines the two signals with fields that are polarized nominally as shown in FIG. 2d for point 16.

Figure 2E:
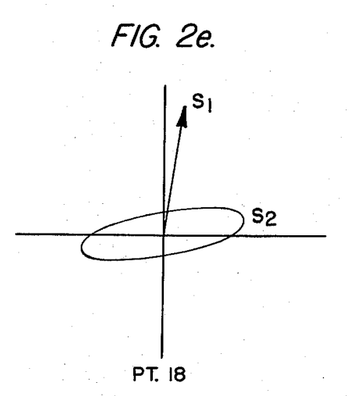
Figure 2F:
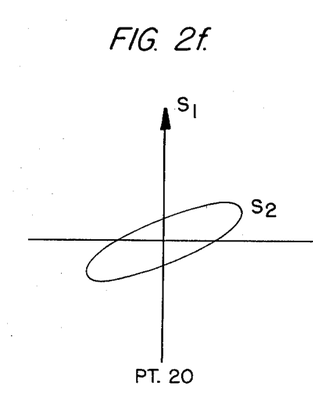

Beginning at point 16, the signal is operated on in the same fashion as the signal at point 10 except that now the signal $S_1$ is linearized and rotated to thereby decouple the signal $S_1$ from the signal $S_2$. In this regard, the output signal from the transducer 42 is first applied to a rotatable quarter-wave plate 44 which shifts by 90° the component of the signal $S_1$ polarized parallel to the minor axis of the $S_1$ ellipse such that this minor axis polarization is now in-phase with the signal polarized in a direction parallel to the major axis of the ellipse $S_1$ in the same manner as the rotatable quarter-wave plate 24. The signal $S_1$ is thus linearized as shown in FIG. 2e for the point 18 of FIG. 1. The signal at point 18 is then applied to a rotatable half-wave plate 46 which rotates the polarization of the linearized signal $S_1$ such that it is parallel to the vertical axis. This rotated signal will thus take the form shown in FIG. 2f for the point 20 of FIG. 1.

When these signals $S_1$ and $S_2$ are applied to an Orthomode transducer 48, the vertically polarized electromagnetic energy will excite the arm connected to the line 50 while the horizontally polarized electromagnetic energy will excite the arm connected to line 52. Since the signal $S_1$ now has no horizontal component, the signal $S_2$ emerges on the line 52 free from cross-coupling due to the signal $S_1$. Thus, the component of the signal $S_1$ on line 54 and the component of the signal $S_2$ on line 52 comprise the decoupled output of the system.

It should be noted that the decoupling circuits discussed above will work with both linear and circular polarizations.

Automatic control of the foregoing decoupling network can be effected by measuring the in-phase and quadrature correlation between the decoupled circuit output signals on the lines 52 and 54. The in-phase correlation voltages obtained in the correlator 56 by means of the in-phase correlation measurement are used to control the half-wave plates 26 and 46. The quadrature correlation voltages are used to control the quarter-wave plates 24 and 44. The control signals generated by the correlator 56 are applied on the lines 60, 62, 64, and 66 to the filters 68, 70, 72, and 74, respectively. These filters, which may take the form of integrators, generate a D.C. control signal to control their respective motors 76, 78, 80, and 82, which are operably connected to rotate their respective rotatable phase-shift plates.

It should be noted that ideally the $S_2$ correlation voltages should be measured at the output of the low-noise amplifiers 34 and 36 in order to avoid the variable transfer coefficient between the low-noise amplifier 34 and the line 52. Similarly, the $S_1$ correlation voltage should be measured between the lines 50 and 52 rather than the lines 52 and 54. However, for nominally orthogonal input polarizations, the transfer coefficient between the low-noise amplifier 36 and the line 54 is nominally constant and its effect can be trimmed out in the correlator. Similarly, the transfer coefficient between the low-noise amplifier 34 and the line 52 is nominally constant. Therefore, a two-channel receiver, rather than a four-channel receiver, is adequate.

Figure 3:
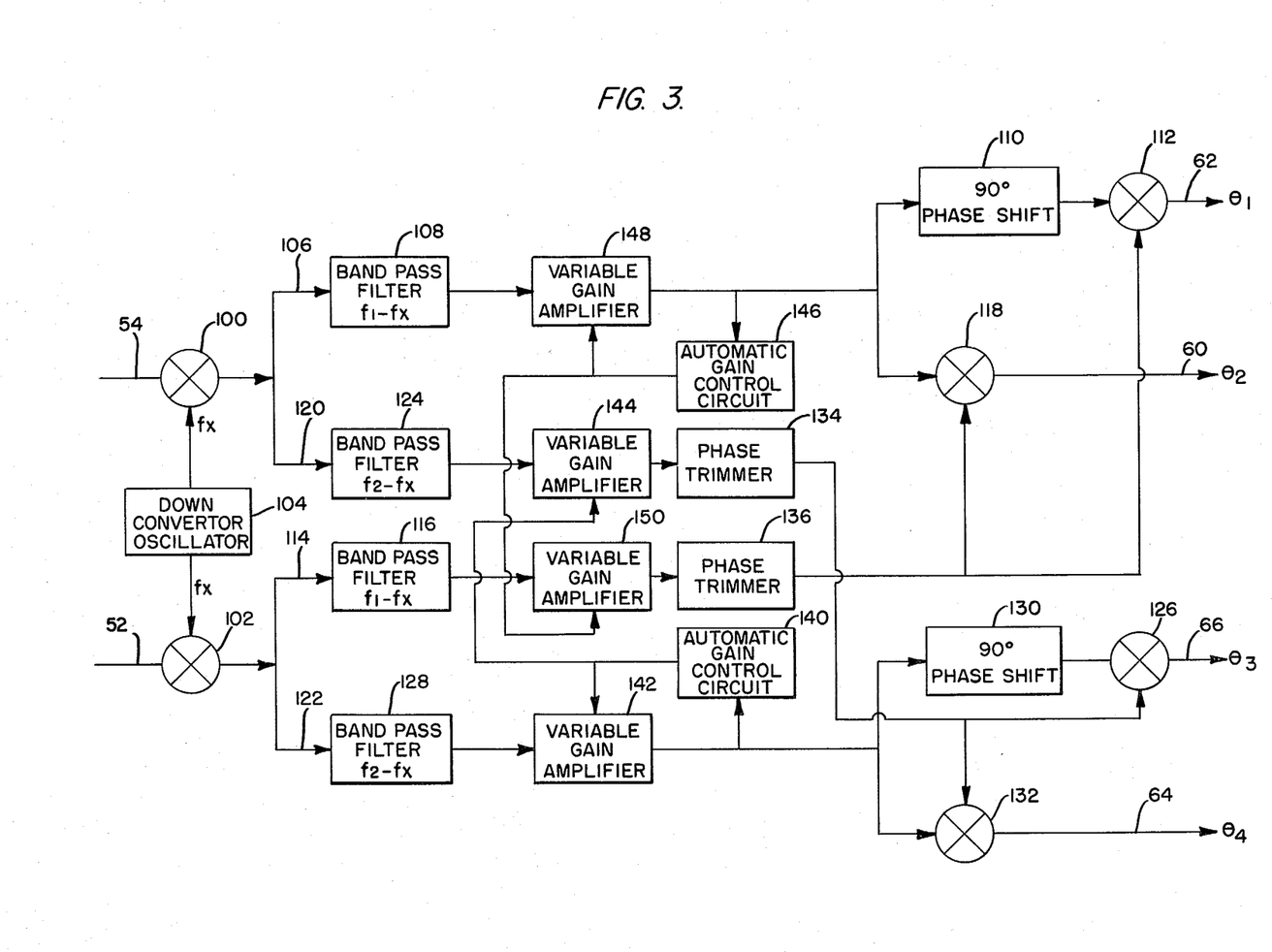
FIG. 3 is a schematic block diagram of one embodiment of the correlator shown in FIG. 1.

Referring now to FIG. 3, there is shown a schematic block diagram of one embodiment of the correlator 56. As noted above, automatic control is effected by this correlator device 56 by measuring the in-phase and quadrature correlation between the decoupled circuit outputs on the lines 52 and 54 in FIG. 1. This measurement is performed in the embodiment shown in FIG. 3 for both signals $S_1$ and $S_2$ by utilizing CW pilot signals at frequencies $f_1$ and $f_2$ transmitted with the $S_1$ and $S_2$ signals, respectively, and having the respective polarizations of those signals.

The signals on lines 54 and 52 are first down-converted to an intermediate frequency which may be more readily operated on. The down-conversion of the signal on line 54 is obtained by mixing the signal on line 54 in a mixer 100 with a signal at a frequency $f_x$ obtained from a down-convertor oscillator 104 oscillating at the frequency $f_x$. Similarly, the signal on line 52 is down-converted by mixing it with the frequency $f_x$ from the down-convertor oscillator 104 in the mixer 102.

Automatic control of the angle $\theta_1$ designating the orientation of the quarter-wave plate in the linearization circuit 44 is obtained by a quadrature correlation measurement of the down-converted pilot frequency $f_1-f_x$ obtained from the mixers 100 and 102. In this regard, the pilot frequency $f_1-f_x$ is filtered from the line 106 by the bandpass filter 108 and applied through a 90° phase shifter 110 to one terminal of a phase comparator 112. The down-converted pilot signal $f_1-f_x$ is obtained from the line 114 by means of a bandpass filter 116 and applied to another terminal of the phase comparator 112. In operation, if the quarter-wave plate orientation angle $\theta_1$ is misaligned, then the pilot signal $f_1-f_x$ on line 114 will be in phase quadrature with the component of the pilot signal $f_1-f_x$ on line 106. Thus, if the pilot signal $f_1-f_x$ components from the lines 106 and 114 were applied directly to the input terminals of the phase comparator 112, this device would provide a zero output. By locating the 90° phase shifter 110 in one of the input lines to the phase comparator 112, a D.C. signal can be obtained at the output of the phase comparator 112. This D.C. signal from the phase comparator 112 is applied, as noted above, on line 62 to the integrating filter 70 which converts that signal to a first control signal. This first control signal may then be applied to the motor 78 to rotate the quarter-wave plate to the desired angle $\theta_1$. It can be shown that this control signal $\theta_1$ is independent of $\theta_2$ for the half-wave plate 46 and is almost independent of the control signals $\theta_3$ and $\theta_4$ for the plates 24 and 26.

The angle $\theta_2$ of the half-wave plate 46 may be obtained in a similar manner by an in-phase correlation measurement of the frequency $f_1-f_x$ obtained from lines 106 and 114. Thus, the component of the pilot signal $f_1-f_x$ in line 106 is obtained from the bandpass filter 108 and applied to one input terminal of the phase comparator 118. Likewise, the component of the pilot signal $f_1-f_x$ in line 114 is obtained from the filter 116 and applied to a second terminal of the phase comparator 118. If $\theta_2$ for the half-wave plate 46 is misaligned, then the pilot frequency $f_1-f_x$ on lines 106 and 114 will be in-phase. Thus, in order to obtain a second control signal, the D.C. output from the phase comparator 118 is applied on line 60 to the filter 68, and the output from the filter 68 may then be utilized to control the motor 76 operably connected to rotate the half-wave plate in the half-wave plate 46. This second control signal is almost independent of the other control variables as long as those other control variables are close to their desired values.

The above-noted filtering and phase comparator components 108, 110, 112, 116, and 118 comprise a first control circuit for controlling the linearization and polarization rotation of the second input signal $S_2$ to thereby decouple the signal $S_1$.

As noted above, in order to decouple the signal $S_2$, the rotatable quarter-wave phase shifter plate 24 and the rotatable half-wave phase shifter plate 26 are provided. The orientation of $\theta_3$ of the rotatable quarter-wave plate is controlled by the quadrature-phase correlation of the down-converted pilot frequency $f_2-f_x$. The control of $\theta_3$ is obtained by filtering this down-converted pilot signal $f_2-f_x$ from the line 120 by means of the bandpass filter 124 and applying this signal to one input of a phase comparator 126. Likewise, the down-converted pilot signal $f_2-f_x$ is obtained from the line 122 by the bandpass filter 128 and applied through a 90° phase shifter 130 to a second terminal of the phase comparator 126. Again, if the quarter-wave plate orientation $\theta_3$ is misaligned, then the down-converted pilot signal $f_2-f_x$ on line 120 will be in-phase quadrature with the component of the pilot signal $f_2-f_x$ on line 122. Thus, a 90° phase shifter 130 must be located in one of the lines to the phase comparator 126 in order to obtain a D.C. control signal at the output of the phase comparator 126. This D.C. control signal from the phase comparator 126 is applied to a filter 74 which converts that signal to a third control signal. This third control signal may then be applied to a motor 82 operably connected to rotate the quarter-wave plate 24. It should be noted that this third control signal is independent of $\theta_4$ for the half-wave plate 26 and is almost independent of the settings $\theta_1$ and $\theta_2$ for the phase shifters 44 and 46, respectively.

The angle of orientation $\theta_4$ for the half-wave plate 26 may be obtained in a similar manner by an in-phase correlation measurement of the down-converted frequency $f_2-f_x$ occurring in the lines 120 and 122. Thus, the component of the pilot signal $f_2-f_x$ is obtained from the line 120 by the bandpass filter 124 and applied to one input terminal of the phase comparator 132. Likewise, the component of the down-converted pilot signal $f_2-f_x$ in line 122 is obtained by the bandpass filter 128 and applied to a second terminal of the phase comparator 132. If $\theta_4$ is misaligned, then the pilot frequency $f_2-f_x$ on lines 120 and 122 will be in-phase. Thus, in order to obtain a control signal, the D.C. output from the phase comparator 132 is applied to the filter 72, and the output from this filter 72 may be utilized to control the motor 80 operably connected to rotate the half-wave plate in the polarization rotator 26. Again, this fourth control signal is almost independent of the other control variables as long as these other control variables are close to their desired values.

The foregoing filter and phase comparator elements 124, 126, 128, 130, and 132 comprise a second control circuit for adaptively cancelling the $S_2$ component in the line 54.

Phase trimmers 134 and 136 may be inserted into the circuit to compensate for incidental phase shifts throughout the various circuits. The phase trimmer 134 is properly adjusted when the quadrature correlation on line 62 is independent of the orientation $\theta_2$ of the half-wave plate 46 in FIG. 1. Likewise, the phase trimmer 136 is properly adjusted when the quadrature correlation on line 66 is independent of the orientation $\theta_4$ of the half-wave plate 26 in FIG. 1. It should be noted at this point that a change in the polarity of the in-phase correlation signal on line 64 will result in rotating the half-wave plate 26 by 45° which effectively interchanges the arms connected to the lines 30 and 32 in the Orthomode transducer 28. Similarly, changing the polarity of the in-phase correlation signal on line 60 will result in rotating the half-wave plate 46 by 45° which effectively interchanges lines 50 and 52 in the Orthomode transducer 48.

An automatic gain control circuit 140 may be included in the network of FIG. 3 to control the gains on the four lines 106, 114, 120 and 122. More specifically, an automatic gain control circuit 140 with an input connected to the line 152 may be utilized to control variable gain amplifiers 142 and 144 set in the lines 122 and 120, respectively. Likewise, an automatic gain control circuit 146 with an input from line 106 my be utilized to control variable gain amplifiers 148 and 150 set in the lines 106 and 114, respectively.

Figure 4:
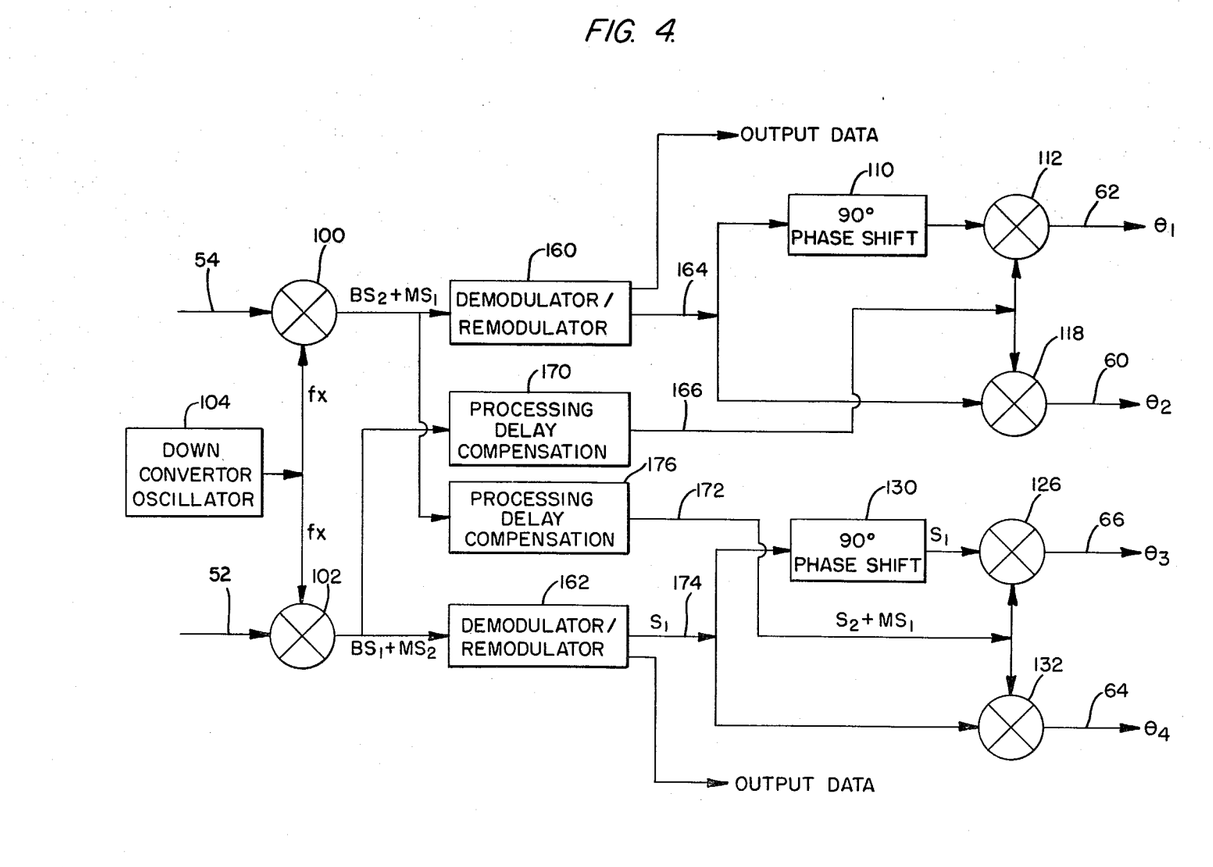
FIG. 4 is a schematic block diagram of a second embodiment of the correlator shown in FIG. 1.

Referring now to FIG. 4, there is shown a schematic block diagram of a second embodiment for the correlator 56. This correlator embodiment utilizes the data signals themselves rather than pilot signals to effect automatic control of the four rotatable phase shift plates. For purposes of explanation only and not by way of limitations, this correlator will be illustrated in the context of a quadriphase phase-shift keyed modulation system. Control using quadriphase phase-shifter data signals is effected by inserting demodulator/remodulators 160 and 162 in the output lines from the mixers 100 and 102, respectively. For proper operation it is necessary to pass each signal through a regenerative repeater. These regenerative repeaters can be of conventional design but special care is required to closely preserve the input/output correlation. For example, with QPSK modulation, the oscillator used in the synchronous demodulator must also be used in the modulator.

The control circuit for the four rotatable phase-shifters in this embodiment is very similar in its operation to the control circuit shown in FIG. 3. More specifically, the first control signal on line 62 for controlling the orientation $\theta_1$ of the quarter-wave plate 44 is obtained by correlating the quadrature component of the demodulated and remodulated signal on line 164 with a down-converted signal on the line 166 in the phase comparator 112. When the orientation $\theta_1$ of the quarter-wave plate 44 is misaligned, then the signals applied to the phase comparator 112 will have a quadrature-phase relationship. When the 90° phase shifter 110 is inserted in the input from the line 164 to the phase comparator 112, then a D.C. signal will be generated. It should be noted that a time delay circuit 170 must be inserted in the line 166 in order to compensate for the large processing delays caused by the demodulator/remodulator 160 in the line 164.

The control signal on line 60 for varying the orientation angle $\theta_2$ for the rotatable half-wave plate 46 is obtained by correlating the in-phase component from the line 164 with the in-phase component of the signal on line 166 in the phase comparator 118. Again, when the orientation angle $\theta_2$ for the rotatable half-wave plate 46 is misaligned, the input signals from the lines 164 and 166 will be in-phase. Thus, the phase comparator 118 will generate a D.C. control signal on line 60.

The control signal on line 66 for controlling the orientation angle $\theta_3$ for the rotatable quarter-wave plate 24 is generated by the quadrature correlation of the signal on line 174 with the signal on line 172 in the phase comparator 126. Likewise, the control signal on line 64 for controlling the orientation angle $\theta_4$ of the rotatable half-wave plate 26 is obtained by the in-phase correlation of the signal on lines 172 and 174 in the phase comparator 132. A delay circuit 176 is inserted in the line 172 in order to compensate for the large processing delays caused by the demodulator/remodulator 162. Phase trimming in this embodiment may be obtained utilizing the same approach discussed in connection with FIG. 3. Finally, it should be noted that if the signals $S_1$ and $S_2$ each contain several frequency division multiplexed signals, the demodulators in the demodulator/remodulator blocks 160 and 162 should preferably be tuned to signals close to the center of the band in order to produce best overall cross talk cancellation for all channels concerned.

The combination of the decoupling circuit disclosed in FIG. 1 and the correlation control circuit including the demodulator/remodulator blocks of FIG. 4 should provide virtually error-free detection of pulse-modulated signals due to polarization crosstalk.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An automatic polarization decoupling network for reestablishing the orthogonality of at least a first and second originally orthogonally polarized transmitted signals which are cross-coupled comprising:
   input means for receiving said first and second transmitted signals;
   first means, coupled to said input means, for linearizing said first signal and rotating said linearized first signal to a predetermined reference direction;
   first separator means, coupled to said first means, for separating the energy in said two signals which is polarized in said predetermined reference direction from the energy in said two signals polarized in a direction orthogonal to said predetermined reference direction, said energy polarized in said predetermined reference direction and said direction orthogonal to said predetermined reference direction being applied to first and second lines, respectively;

combining means, coupled to said first and second lines, for recombining at least part of the energy of said first and second lines;

second means, coupled to said combining means, for linearizing said second signal and rotating said linearized second signal to a direction orthogonal to said predetermined reference direction;

second separator means, coupled to said second means, for separating the energy in said two signals which is polarized in said predetermined reference direction from the energy in said two signals polarized in a direction orthogonal to said predetermined reference direction, said energy polarized in said predetermined reference direction being applied to a third line; and correlator means, coupled to said second line and said third line, for appropriately correlating the signals on said second line and said third line and generating a plurality of control signals for controlling the linearization and rotation of said first and second signals in said first and second linearizing and rotating means.

2. An automatic polarization decoupling network as defined in claim 1, wherein said first and second linearizing and rotating means each comprise a phase shifter and a polarization rotator.

3. An automatic polarization decoupling network as defined in claim 2, wherein said phase shifter is a quarter-wave plate and said polarization rotator is a half-wave plate.

4. An automatic polarization decoupling network as defined in claim 2, wherein said first signal has a first pilot signal transmitted therewith and said second signal has a second pilot signal transmitted therewith, and wherein said correlation means comprises a plurality of phase comparators for comparing the phases of each of said first and second pilot signals on one of said second and third lines to its in-phase and quadrature-phase components coupled in the other of said second and third lines and generating a plurality of control signals for controlling the phase shifters and the polarization rotators in said first and second linearization and rotation means.

5. An automatic polarization decoupling network as defined in claim 1, wherein said first and second separator means and said combining means comprise Orthomode transducers.

6. An automatic polarization decoupling network as defined in claim 2, wherein said correlation means comprises:

first demodulator/remodulator means for demodulating and remodulating the signal on said second line;

a second demodulator/remodulator means for demodulating and remodulating the signal on said third line; and a plurality of phase comparators for appropriately correlating the output signals from said first and second demodulator/remodulator means with appropriately delayed signals from said second and third lines and generating a plurality of control signals for controlling the phase shifter and the polarization rotator in said first and second linearization and rotation means.

7. An automatic polarization decoupling network as defined in claim 2, wherein said correlation means comprises:

first demodulator/remodulator means for demodulating and remodulating the signal on said second line;

second demodulator/remodulator means for demodulating and remodulating the signal on said third line;

first phase comparator means for comprising the phase of the appropriately delayed signal from said second line with the phase of the output signal from said second demodulator/remodulator means appropriately shifted in phase and generating a first control signal for controlling the phase shifter in said first linearization and rotation means;

second phase comparator means for comparing the phase of the appropriately delayed signal from said second line with the output signal from said second demodulator/remodulator means and generating a second control signal for controlling the polarization rotator in said first linearization and rotation means;

third phase comparator means for comparing the phase of the appropriately delayed signal from the third line with the phase of the output signal from the first demodulator/remodulator means appropriately shifted in phase and generating a third control signal for controlling the phase shifter in said second linearization and rotation means; and fourth phase comparator means for comparing the phase of the output signal from said first demodulator/remodulator means with the phase of the appropriately delayed signal from the third line and generating a fourth control signal for controlling the polarization rotator in said second linearization and rotation means.

8. An automatic polarization decoupling network as defined in claim 2, wherein said first signal has a first pilot signal and said second signal has a second pilot signal transmitted therewith, and wherein said correlation means comprises:

first phase comparator means for comparing the phase of the first pilot signal from the second line with the phase of the first pilot signal from the third line appropriately shifted in phase and generating a first control signal for controlling said phase shifter in said first linearizing and rotating means;

second phase comparator means for comparing the phase of said first pilot signal from the second line with the phase of the first pilot signal from the third line and generating a second control signal for controlling the polarization rotator in said first linearization and rotation means;

third phase comparator means for comparing the phase of the second pilot signal from said third line with the phase of said second pilot signal from said second line appropriately shifted in phase and generating a third control signal for controlling the phase shifter in said second linearization and rotation means; and fourth phase comparator means for comparing the phase of the second pilot signal from the second line with the phase of the second pilot signal from the third line and generating a fourth control signal for controlling the polarization rotator in said second linearization and rotation means.

9. A method for automatically reestablishing the orthogonality of at least a first and second originally orthogonally polarized signals which are cross-coupled, comprising the steps of:

receiving said first and second transmitted signals;

linearizing said second signal and rotating said linearized second signal to a predetermined reference direction;

separating the energy in said two signals which is polarized in said predetermined reference direction from the energy in said two signals polarized in a direction orthogonal to said predetermined reference direction, and applying said energy polarized in said predetermined direction and said direction orthogonal to said predetermined direction to a first and second line, respectively;

recombining the energy on said first and second lines;

linearizing said first signal and rotating said linearized first signal to a direction orthogonal to said predetermined reference direction;

separating the energy in said two signals which is polarized in said predetermined reference direction from the energy in said two signals polarized in a direction orthogonal to said predetermined reference direction, and applying said energy polarized in said predetermined reference direction to a third line; and appropriately correlating the signal on said second line with the signal on said third line and generating a plurality of control signals for controlling the linearization and the rotation operation in said two linearizing and rotating steps.

10. A method as defined in claim 9, wherein said receiving step includes the step of receiving a first pilot signal transmitted with said first transmitted signal and receiving a second pilot signal transmitted with said second signal; and said correlation step comprises the step of correlating the phases of each of the pilot signals on one of the second or third lines to its in-phase and quadrature-phase components coupled in the other of the second and third lines and generating control signals from these phase comparisons.

11. A method as defined in claim 9, wherein said correlation step comprises the steps of:

demodulating and then remodulating the signal on said second line;

demodulating and then remodulating the signal on said third line; and appropriately phase comparing these demodulated and remodulated signals from the second and third lines with appropriately delayed signals from the second and third lines and generating control signals from these phase comparisons.

* * * * *